March 13, 1956     J. E. CRANE     2,737,848
CLIP-ON SUNGLASS
Filed July 22, 1954
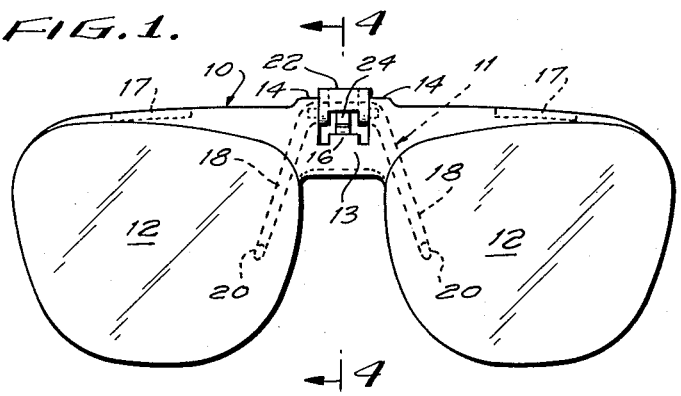
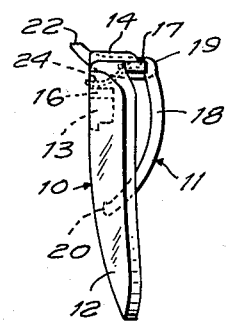
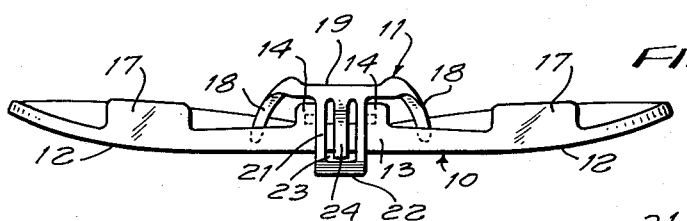
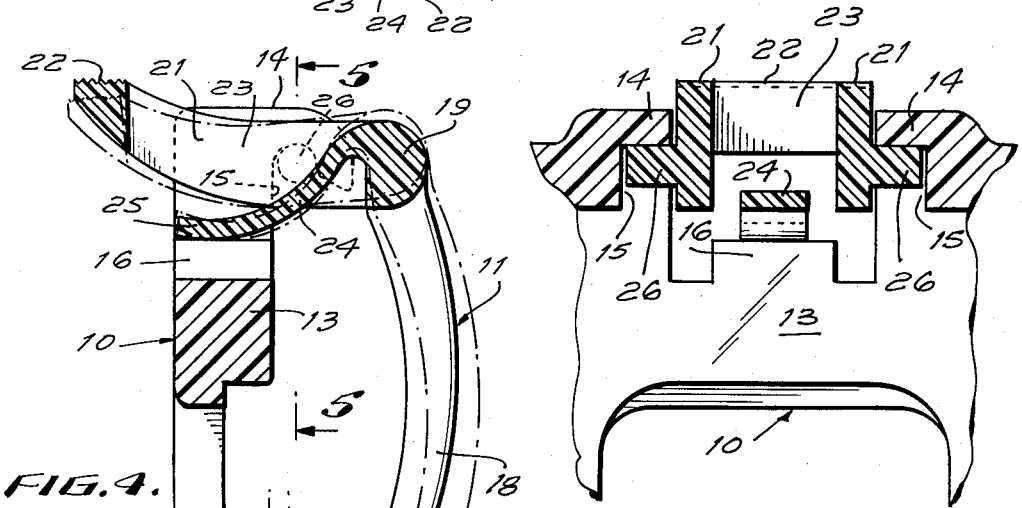
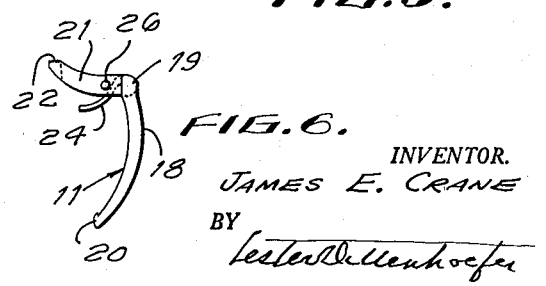
INVENTOR.
JAMES E. CRANE
BY
Lester D. Ullenhoefer
ATTORNEY

United States Patent Office 2,737,848
Patented Mar. 13, 1956

2,737,848

CLIP-ON SUNGLASS

James E. Crane, Leominster, Mass., assignor to Foster Grant Co., Inc., Leominster, Mass., a corporation of Massachusetts Application July 22, 1954, Serial No. 444,937

2 Claims. (Cl. 88—41)

This invention relates to clip-on or auxiliary sunglasses for use with ordinary spectacles or eyeglasses, and more particularly to certain improvements in construction of such articles.

The principal object is to reduce the cost of manufacture by providing a simplified construction consisting essentially of only two members, namely, a lens member and a clip member.

Another object is to provide a sunglass with a spring appurtenant to its clip member, which spring serves to secure the two members together in assembled relation without necessity of any other fastening means, and also serves to hold the sunglass firmly in place when applied to a pair of spectacles or eyeglasses.

A further object is to provide a construction whereby the two members may be rapidly and easily put together with a minimum of labor.

Other objects and advantages of the invention will appear from the following description thereof, reference being had to accompanying drawings, in which:

Fig. 1 is a front elevation of a clip-on sunglass embodying the invention;

Fig. 2 is a side elevation thereof;

Fig. 3 is a top plan view;

Fig. 4 is an enlarged vertical cross-section on the line 4—4 of Fig. 1, showing in dotted lines the position of the parts as clipped on to a pair of spectacles or eyeglasses;

Fig. 5 is a horizontal cross-section on the line 5—5 of Fig. 4; and

Fig. 6 is a side elevation of the clip member apart from the lens member.

The sunglass is composed of only two members, to wit, a lens member 10 and a clip member 11, each of which is preferably, though not necessarily, made in one piece.

The lens member 10 comprises two lenses 12 connected by a bridge 13. The member may be conveniently made of a single piece of plastic or other suitable material designed to protect the eyes from the sun. If desired, suitably colored glass lenses may be employed.

Projections 14 are provided on the lens member at opposite sides of the bridge, each of which has a recess 15 extending upward from its lower surface. In the particular form of construction illustrated the projections are curved at their inner ends, as seen in Fig. 4, to provide the recesses 15. The recesses serve as bearings for the pivots 26 of the clip member 11 when the two members are assembled. A projection or abutment extends upward at 16 from the middle of the upper surface of the bridge. Ears 17 may be formed above the lenses 12 to fit over the lenses of the spectacles or eyeglasses to which the sunglass is applied.

The clip member 11 is forked or wishbone-shaped, and is preferably made in one piece of nylon or any other suitable plastic or material having the desired property of resilience so that the spring element of the clip member may be formed as an integral part thereof. The member 11 comprises a pair of arms 18 connected at the top by a cross-arm 19. The arms 18 are bowed longitudinally so that their lower ends 20 will bear on the inner face of the lenses 12 or the lenses of the spectacles or eyeglasses, as the case may be. To prevent scratching the ends 20 may be tipped with a suitable soft substance.

Projecting forward from the cross-arm 19 is a lug 21 that terminates in a finger-piece 22 and that has a central slot or opening 23. A spring finger 24 projects forward and downward in the slot from the cross-arm in position that its end 25 will bear freely on the abutment 16 of the bridge of the lens member. Two pivots 26 project from opposite sides of the clip member.

In assembling the two members the pivots of the clip member are inserted in the recesses 15 while at the same time the spring finger 24 is sprung into position with its free end bearing on the abutment 16. The upward thrust of the spring finger serves to hold the pivots in their bearings and to secure the two members together without any other securing means.

By pressing down the finger-piece 22 of the clip member the arms 18 thereof may be swung rearwardly to permit the sunglass to be placed over the lenses of the pair of spectacles or eyeglasses to which it is to be attached. In a similar manner the sunglass may be readily detached when no longer required.

It is to be understood that modifications in the construction herein described may be made within the scope of the invention as claimed.

What I claim is:

1. A clip-on sunglass comprising a lens member and a clip member, the lens member having a pair of lenses connected by a bridge, rearwardly extending projections on the lens member at opposite sides of the bridge, each projection having a recess in its rear end open at the bottom, said recesses providing bearings in which the pivots of the clip member are received and journaled, the clip member having a pair of arms connected at the top by a cross-arm and pivots at opposite sides, a lug extending forward from the cross-arm for swinging the clip member about its axis, said lug having a central slot, a spring finger fixed to the cross-arm to pass downward and forward through the slot, the free end of said spring finger bearing on the upper surface of a middle portion of the bridge to effect an upward thrust that maintains the pivots journaled in their bearings and holds the two members in assembled relation, said spring finger also acting to urge the lower ends of the arms of the clip member resiliently into contact with the inner surface of the lenses of the lens member.

2. A clip-on sunglass comprising a lens member and a forked-shape clip member adapted to engage the lens member, the lens member having a pair of lenses connected by a bridge, bearings and complementary oppositely disposed pivots on said lenses and the upper part of said clip member, respectively, each of said pivots being releasably received by a corresponding one of said bearings, in order to mount said clip member turnably on said lens member, and a spring finger projecting from said clip member and bearing freely on the upper surface of said bridge, said pivots being arranged relative to said spring finger in such manner that the latter urges a rotating movement of said clip member, said bearings having open sides so arranged that the thrust of said spring finger urges said pivots into said bearings in order to retain the said pivots in their corresponding bearings and simultaneously resiliently urge the fork ends of said clip member into engaging position with said lenses.

References Cited in the file of this patent

UNITED STATES PATENTS

| | | |
|---|---|---|
| 1,596,810 | Cooney | Aug. 17, 1926 |
| 2,516,764 | Ehlert et al. | July 25, 1950 |
| 2,584,000 | Ehlert et al. | Jan. 29, 1952 |